US011479425B2

(12) United States Patent
Takahashi (10) Patent No.: US 11,479,425 B2
(45) Date of Patent: Oct. 25, 2022

(54) ONE-WAY CLUTCH, SHEET CONVEYING APPARATUS, AND IMAGE FORMING APPARATUS

(71) Applicant: CANON KABUSHIKI KAISHA, Tokyo (JP)

(72) Inventor: Kakeru Takahashi, Toride (JP)

(73) Assignee: Canon Kabushiki Kaisha, Tokyo (JP)

(*) Notice: Subject to any disclaimer, the term of this patent is extended or adjusted under 35 U.S.C. 154(b) by 804 days.

(21) Appl. No.: 16/367,333

(22) Filed: Mar. 28, 2019

(65) Prior Publication Data

US 2019/0300309 A1    Oct. 3, 2019

(30) Foreign Application Priority Data

Mar. 29, 2018 (JP) .............................. JP2018-064294

(51) Int. Cl.
| B65H 5/06 | (2006.01) |
| F16D 11/00 | (2006.01) |
| F16D 41/06 | (2006.01) |

(52) U.S. Cl.
CPC .............. *B65H 5/06* (2013.01); *F16D 11/00* (2013.01); *F16D 41/06* (2013.01); *B65H 2403/481* (2013.01); *B65H 2403/722* (2013.01)

(58) Field of Classification Search
None
See application file for complete search history.

(56) References Cited

U.S. PATENT DOCUMENTS

| 6,931,954 B2* | 8/2005 | Jinbo | ..................... F16H 3/005 |
| | | | 74/64 |
| 2005/0130794 A1* | 6/2005 | Jinbo | ..................... F16D 41/06 |
| | | | 475/331 |
| 2015/0003871 A1* | 1/2015 | Takahashi | .......... G03G 21/1647 |
| | | | 399/329 |

FOREIGN PATENT DOCUMENTS

| JP | 2004-019757 A | 1/2004 |
| JP | 2010-106985 A | 5/2010 |

OTHER PUBLICATIONS

JP2004019757 translation (Year: 2004).*

* cited by examiner

*Primary Examiner* — Timothy Hannon
(74) *Attorney, Agent, or Firm* — Venable LLP (57) ABSTRACT

A one-way clutch includes: an outer member that has an inner periphery including an internal gear; an inner member that is rotatably disposed, and includes an engagement portion; and a planetary gear that is rotatable relative to the inner member, meshes with the internal gear, and is prevented from rotating by engaging with the engagement portion, wherein in a state in which the outer member and the inner member rotate together, the planetary gear engages with the engagement portion; in a state in which relative rotation between the outer member and the inner member is performed, the planetary gear disengages from the engagement portion; and in a state in which the planetary gear engages with the engagement portion, a top land of the internal gear abuts on a bottom land of the planetary gear.

18 Claims, 11 Drawing Sheets

ONE-WAY CLUTCH, SHEET CONVEYING APPARATUS, AND IMAGE FORMING APPARATUS

BACKGROUND OF THE INVENTION

Field of the Invention

The present invention relates to a one-way clutch, a sheet conveying apparatus that includes the one-way clutch, and an image forming apparatus that includes the one-way clutch.

Description of the Related Art

As a one-way clutch that is used in a sheet conveying system in an image forming apparatus, such an internal-gear-type one-way clutch as disclosed in Japanese Patent Laid-Open No. 2004-19757 has been known. The internal-gear-type one-way clutch includes an outer member that is cylindrical and has an inner periphery including an internal gear, an inner member that is rotatably disposed within the internal gear and includes a plurality of recesses each of which includes an engagement edge portion at an outer periphery of each recess, and a plurality of planetary gears that is rotatably accommodated in the plurality of corresponding recesses and meshes with the internal gear. In the one-way clutch, when the inner member rotates to one side relative to the outer member, the rotation allows a portion between two teeth of each planetary gear to engage with the corresponding engagement edge portion so that each planetary gear is prevented from rotating and allows the outer member to engage with the inner member in torque transmission relationship. Further, in the one-way clutch, when the inner member rotates to the other side relative to the outer member, the rotation disengages the portion between two teeth of each planetary gear from the corresponding engagement edge portion so that each planetary gear is allowed to rotate, allows relative rotation between the outer member and the inner member, and disengages the torque transmission relationship between the outer member and the inner member.

Although a diameter of such an internal-gear-type one-way clutch as described above can be reduced compared with a ratchet-type one-way clutch, tooth-shape strength of the planetary gears limits the reduction in the diameter. The reduction in a diameter of the above internal-gear-type one-way clutch reduces a diameter of the planetary gears. Reduction in size of teeth of the planetary gears causes insufficient tooth-shape strength, which causes decrease in allowable transmission torque.

With respect to the above problem, such a configuration as disclosed in Japanese Patent Laid-Open No. 2010-106985 is proposed in which the plurality of recesses of the inner member is disposed at positions that do not overlap each other in an axial direction of the inner member to prevent reduction in a diameter of the planetary gears.

In the configuration disclosed in Japanese Patent Laid-Open No. 2010-106985, however, since the one-way clutch is long in the axial direction, the one-way clutch may not be disposed in some configurations of an apparatus. Further, the configuration may not be applied to a one-way clutch that is supported by a shaft inserted in a through hole that penetrates through a center of the one-way clutch.

SUMMARY OF THE INVENTION

Accordingly, it is desirable to facilitate reduction in a diameter of a one-way clutch without causing decrease in allowable transmission torque and increase in axial size.

It is desirable to provide a one-way clutch according to the present invention, the one-way clutch including: an outer member that has an inner periphery including an internal gear; an inner member that is rotatably disposed and includes an engagement portion; and a planetary gear that is rotatable relative to the inner member, meshes with the internal gear, and is prevented from rotating by engaging with the engagement portion, wherein in a state in which the outer member and the inner member rotate together, the planetary gear engages with the engagement portion; in a state in which relative rotation between the outer member and the inner member is performed, the planetary gear disengages from the engagement portion; and in a state in which the planetary gear engages with the engagement portion, a top land of the internal gear abuts on a bottom land of the planetary gear.

The present invention facilitates reduction in a diameter of a one-way clutch without causing decrease in allowable transmission torque and increase in axial size.

Further features of the present invention will become apparent from the following description of exemplary embodiments with reference to the attached drawings.

DESCRIPTION OF THE EMBODIMENTS

Hereinafter, an exemplary embodiment according to the present invention will be described in detail with reference to the drawings. However, sizes, material, shape, and relative arrangement of components described in the embodiment described below are appropriately changed according to a structure of an apparatus to which the present invention is applied or various conditions. Therefore, the scope of the present invention is not limited to the sizes, material, shape, and relative arrangement of components described in the embodiment described below unless otherwise specified.

Example 1

Figure 10:
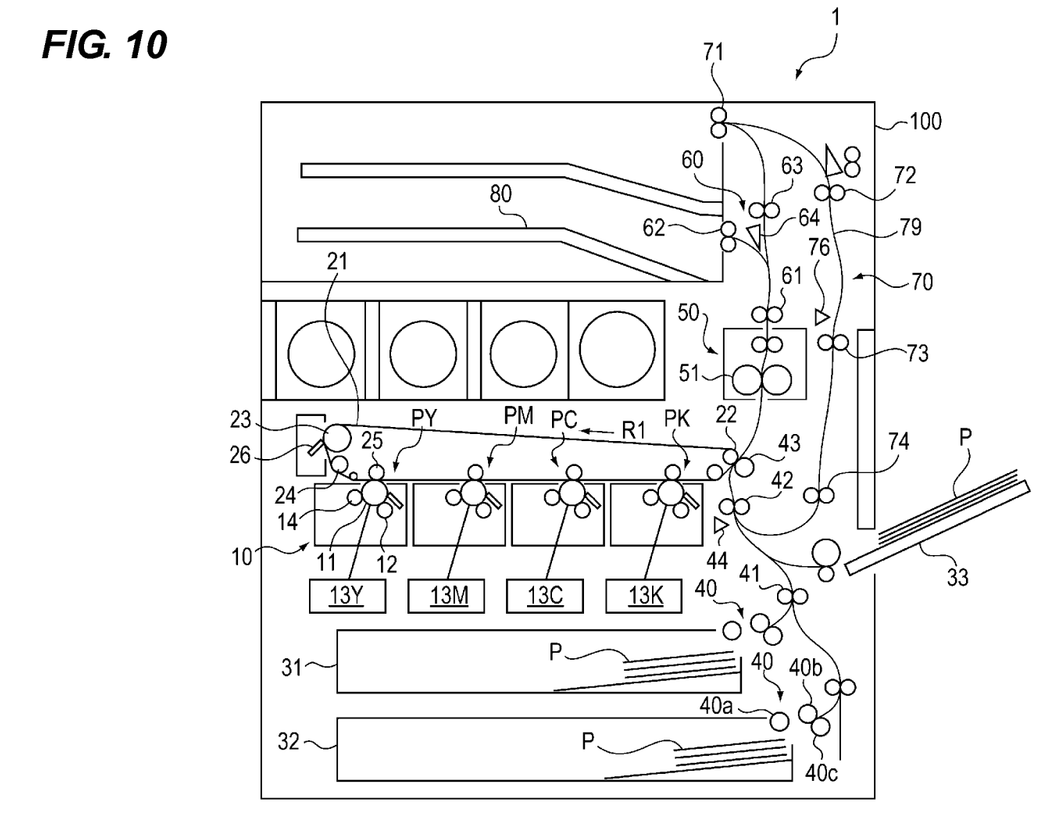
FIG. 10 illustrates an image forming apparatus that includes the one-way clutch according to the present example.
Figure 11:
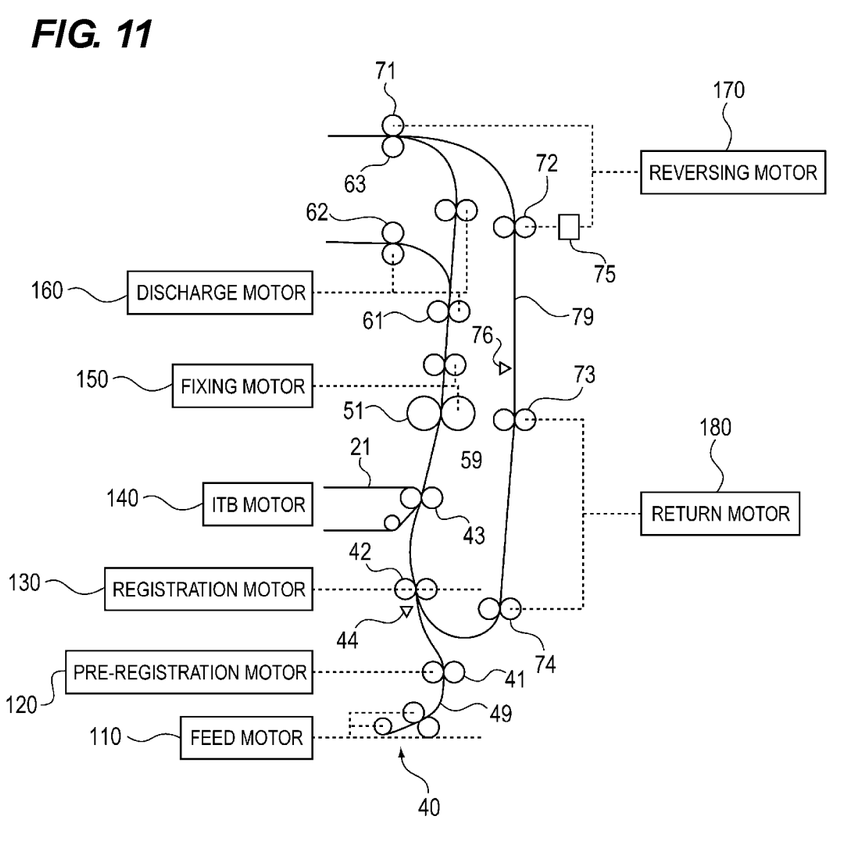
FIG. 11 illustrates a sheet conveying apparatus in the image forming apparatus according to the present example.

An image forming apparatus that includes a sheet conveying system that includes a one-way clutch according to an example of the present invention will be described with reference to FIGS. 10 and 11. FIG. 10 is a cross-sectional view that illustrates an example of configuration of the image forming apparatus. FIG. 11 is a schematic view that illustrates the sheet conveying system (sheet conveying apparatus) in the image forming apparatus. First, the image forming apparatus will be described. Next, the sheet conveying system in the image forming apparatus will be described. Finally, the one-way clutch will be described. The one-way clutch will be described in detail with reference to FIGS. 1 to 9.

Image Forming Apparatus

As illustrated in FIG. 10, an image forming apparatus 1 is a color laser printer of an electrophotographic system that forms and outputs an image on a sheet P used as a recording medium. As the sheet P, a sheet, such as plain paper and an envelope, glossy paper, a plastic film, such as a sheet for overhead projectors, and cloth are employed. A main body 100 of the image forming apparatus 1 accommodates an image forming engine 10 that includes four image forming portions PY, PM, PC, and PK that form yellow, magenta, cyan, and black toner images, respectively, and an intermediate transfer belt 21. Each of the image forming portions PY to PK includes a photosensitive drum 11 as an image bearing member, and forms a toner image on the photosensitive drum 11. The toner image borne by the photosensitive drum 11 is transferred to a sheet P through the intermediate transfer belt 21 as an intermediate transfer member.

Since the image forming portions PY to PK are similarly constructed except that different toner colors are used for developing, the yellow image forming portion PY is exemplified to describe a structure of the image forming portions and a process that forms a toner image (image forming operation). The image forming portion PY includes a charge roller 12 as a charge portion, an exposure unit 13Y as an exposure portion, a developer unit 14 as a developer portion, and a drum cleaner, in addition to the photosensitive drum 11. The photosensitive drum 11 is a drum-shaped photosensitive body that includes a photosensitive layer on an outer periphery of the photosensitive drum 11, and rotates in a direction along a rotational direction R1 of the intermediate transfer belt 21. The charge roller 12 uniformly charges a surface of the photosensitive drum 11, and the exposure unit 13Y irradiates the photosensitive drum 11 with a laser beam modulated by image information to produce an electrostatic latent image on the surface of the photosensitive drum 11. The developer unit 14 accommodates developer that contains toner, and supplies the toner to the photosensitive drum 11 to develop a toner image from the electrostatic latent image. The toner image formed on the photosensitive drum 11 is primarily transferred to the intermediate transfer belt 21 by a primary transfer roller 25 as a primary transfer unit. Residual toner remaining on the photosensitive drum 11 after the transfer is removed by the drum cleaner.

The intermediate transfer belt 21 runs around a second transfer inner roller 22, a suspending roller 23, a tension roller 24, and the primary transfer roller 25, and is rotated in a counterclockwise direction (R1) in the drawing. The above image forming operation is simultaneously performed in each of the image forming portions PY to PK and four-color toner images are transferred in a superimposed manner to form a colorful toner image on the intermediate transfer belt 21. The toner image is borne and transferred by the intermediate transfer belt 21 to a transfer portion (secondary transfer portion) constituted as a nipping portion that exists between a secondary transfer roller 43 and the secondary transfer inner roller 22. When bias voltage that has opposite-polarity that is opposite to charged polarity of the toner is applied to the secondary transfer roller 43 as the transfer portion, the toner image borne by the intermediate transfer belt 21 is secondarily transferred to a sheet P. Residual toner remaining on the intermediate transfer belt 21 after the transfer is removed by a belt cleaner 26.

The sheet P on which the toner image has been transferred is conveyed to a fixing unit 50. The fixing unit 50 includes a pair of fixing rollers 51 that nips and conveys the sheet P, and a heat source, such as a halogen heater, and applies pressure and heat to the toner image borne by the sheet P. As a result, toner particles are fused and fixed, and a fixed image that is fixed to the sheet P is obtained.

Next, conveying operation of a sheet P by the image forming apparatus 1 will be described. Sheet cassettes 31, 32 accommodate sheets P, and are disposed in and can be pulled out from the main body 100. The sheets P accommodated in the sheet cassettes 31, 32 are fed by respective feed units 40, one sheet by one sheet. Each of the feed units 40 includes a pickup roller 40a that picks up a sheet P from the corresponding sheet cassettes 31, 32, and a feed roller 40b that receives and conveys the sheet P from the pickup roller 40a. Further, each of the feed units 40 also includes a separating roller 40c that separates a sheet P conveyed by the feed roller 40b from another sheet P. The feed unit 40 is an example of a feed portion that feeds a sheet P. A belt-type feed portion that conveys a sheet P sucked onto a belt member by a suction fan, or a frictional-separation-type feed portion that includes a pad may be employed. A user can directly set sheets P on a bypass tray 33 disposed on a side of the main body 100, and the sheets P set on the bypass tray 33 are fed by another feed unit.

A sheet P fed from the feed unit 40 is conveyed to a pair of registration rollers 42 through a pair of pre-registration rollers 41. The pair of registration rollers 42 as an example of a registration portion abuts on a front end, that is, a downstream end in a conveyance direction of a sheet, of the sheet P to correct skew feeding of the sheet P. Then, the pair of registration rollers 42 conveys the sheet P to the secondary transfer portion at a time that corresponds to progress of the image forming operation by the image forming portions PY to PK. The sheet P on which the toner image has been transferred in the secondary transfer portion and fixed by the fixing unit 50 is conveyed to a sheet discharge portion 60, and a pair of rollers 61 after fixing conveys the sheet P to a switching member 64 that switches a conveyance path of a sheet P.

If image formation on the sheet P has been completed, the sheet P on which the image has been formed on a first surface (front) of the sheet P is discharged to a discharge tray 80 by a pair of discharge rollers 62. If another image is formed on a second surface (back) of the sheet P, the sheet P is conveyed to a reverse conveying portion 70 through a pair of conveying rollers 63 by the switching member 64. The reverse conveying portion 70 includes a pair of reversing rollers 71 that reversely conveys the sheet P, and a return path 79 that guides the sheet P that has been reversely conveyed by the pair of reversing rollers 71 to the pair of registration rollers 42. The pair of reversing rollers 71 conveys a predetermined length of the sheet P toward a discharge space above the discharge tray 80, and then reversely conveys the sheet P to the return path 79. The return path 79 includes a plurality pairs of conveying rollers (72, 73, 74) that will be described in detail below, and conveys the sheet P to the pair of registration rollers 42 again. Then, the sheet P on which another image has been formed on the second surface by passing through the secondary transfer portion and the fixing unit 50 is discharged to the discharge tray 80 by the pair of discharge rollers 62.

The above image forming engine 10 is an example of the image forming portions, and may be of a direct-transfer type that directly transfers a toner image formed on a photosensitive body to a sheet in a transfer portion, for example. Further, the image forming portion may be of an inkjet type or an offset-printing type.

Sheet Conveying System

In the image forming apparatus 1, a sheet conveying system that conveys a sheet includes the followings. As illustrated in FIG. 11, the image forming apparatus 1 includes a feed path 49, an image formation path 59, and a return path 79. A guide member supported by the main body 100 constitutes a sheet conveyance space in these paths.

The feed path 49 is a conveyance path through which a sheet P is fed, and the feed unit 40 and the pair of pre-registration rollers 41 are disposed along the feed path 49. The feed unit 40 is driven by a feed motor 110, and the pair of pre-registration rollers 41 is driven by a pre-registration motor 120.

The image formation path 59 is a conveyance path through which a sheet P is conveyed and an image is formed, and the pair of registration rollers 42, the secondary transfer roller 43 and the secondary transfer inner roller 22, and the pair of fixing rollers 51 are disposed along the image formation path 59. The pair of registration rollers 42 is driven by a registration motor 130, the secondary transfer inner roller 22 is driven by an intermediate transfer belt (ITB) motor 140, and the pair of fixing rollers 51 is driven by a fixing motor 150.

The return path 79 is a conveyance path through which a sheet P that has been conveyed from the image formation path 59 is conveyed to the image formation path 59 again to perform duplex printing. A first pair of returning rollers 72, a second pair of returning rollers 73, and a third pair of returning rollers 74 are disposed along the return path 79. The pair of reversing rollers 71 receives a sheet P from the image formation path 59, and reverses and conveys the sheet P to the return path 79. The first to third pairs of returning rollers 72 to 74 are sequentially disposed along a direction from the pair of reversing rollers 71 to the pair of registration rollers 42 along the return path 79 (hereinafter referred to as the "sheet conveyance direction" unless otherwise specified)

The pair of reversing rollers 71 and the first pair of returning rollers 72 are driven by a reversing motor 170, and the second pair of returning rollers 73 and the third pair of returning rollers 74 are driven by a return motor 180. The reversing motor 170 is a motor that rotates forward or rearward, and is connected through a one-way clutch 75 to the first pair of returning rollers 72 as a conveying member that conveys a sheet. A return sensor 76 as a detecting portion that detects a sheet is disposed between the first pair of returning rollers 72 and the second pair of returning rollers 73 along the sheet conveyance direction. A registration sensor 44 as another detecting portion is disposed near an upstream side of the pair of registration rollers 42. For example, photoelectric sensors that detect light being interrupted by a sheet may be employed for these sensors. The present invention is applied to the one-way clutch 75. The one-way clutch will be described in detail below with reference to FIGS. 1 to 9.

When the reversing motor 170 rotates forward, the pair of reversing rollers 71 conveys a sheet to the discharge portion. When the reversing motor 170 rotates forward, that is, to the other side, driving force is not transmitted to the first pair of returning rollers 72 from the reversing motor 170 by action of the one-way clutch 75. When the reversing motor 170 rotates rearward, the pair of reversing rollers 71 conveys a sheet to the first pair of returning rollers 72. When the reversing motor 170 rotates rearward, that is, to one side, driving force is transmitted to the first pair of returning rollers 72 from the reversing motor 170 through the one-way clutch 75. When the second pair of returning rollers 73 nips the sheet conveyed by the pair of reversing rollers 71 and the first pair of returning rollers 72 that are rotated by driving force from the reversing motor 170 that rotates rearward, the reversing motor 170 will be driven forward. Even if the reversing motor 170 is driven forward, the second pair of returning rollers 73 driven by the return motor 180 conveys the sheet. That is, action of the one-way clutch 75 allows the first pair of returning rollers 72 to be rotated by the sheet conveyed by the second pair of returning rollers 73, and the second pair of returning rollers 73 conveys the sheet to pull the sheet out of the first pair of returning rollers 72. During that time, since the reversing motor 170 rotates forward, the pair of reversing rollers 71 conveys a next sheet conveyed from the pair of conveying rollers 63 to the discharge portion.

One-way Clutch

Figure 1:
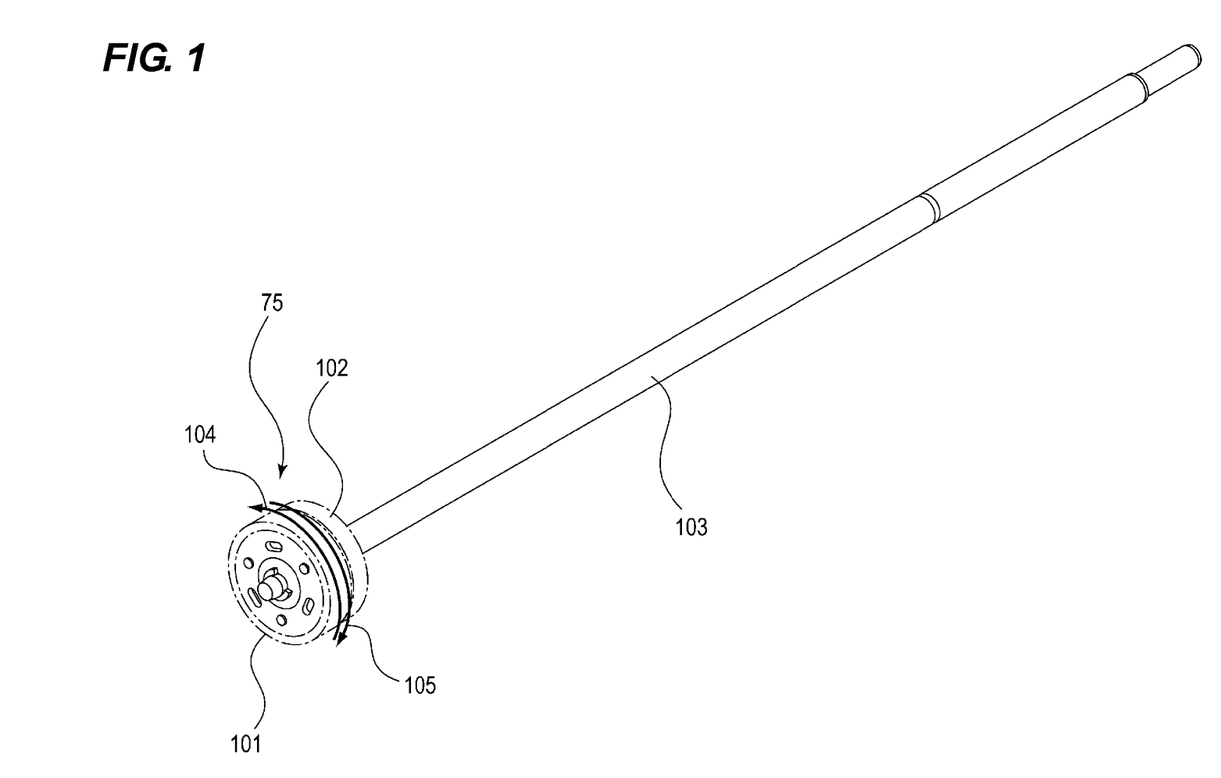
FIG. 1 is an overall view of a one-way clutch according to a present example.
Figure 2A:
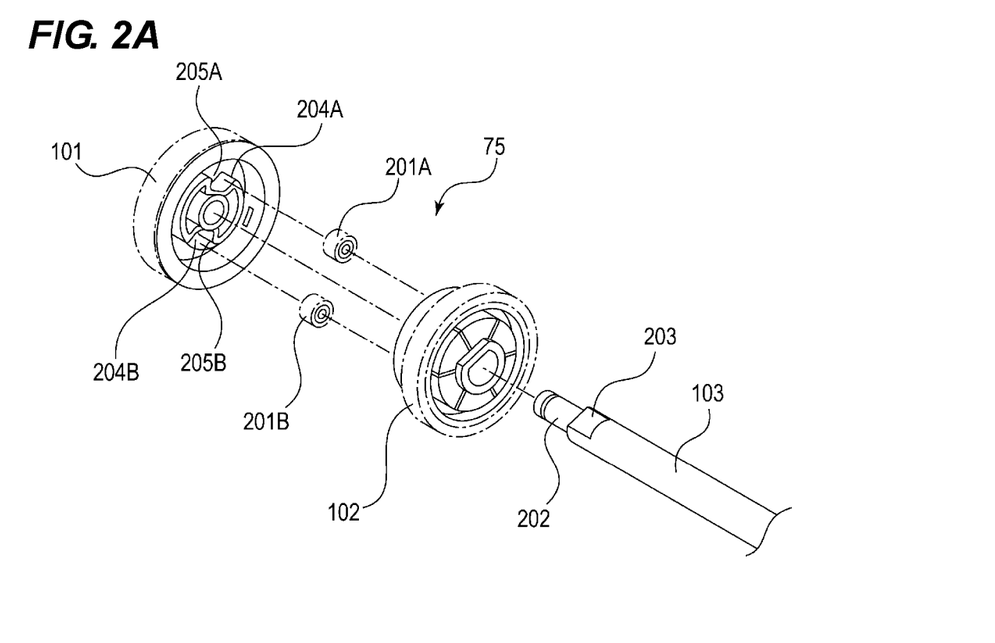
FIGS. 2A and 2B are exploded views of the one-way clutch according to the present example.
Figure 2B:
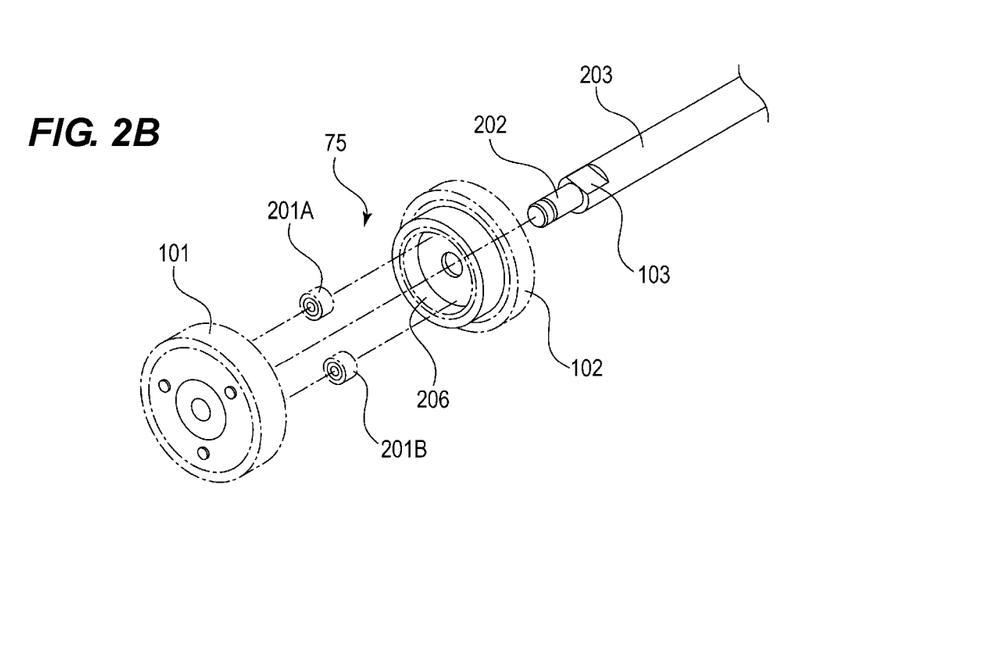
Figure 3A:
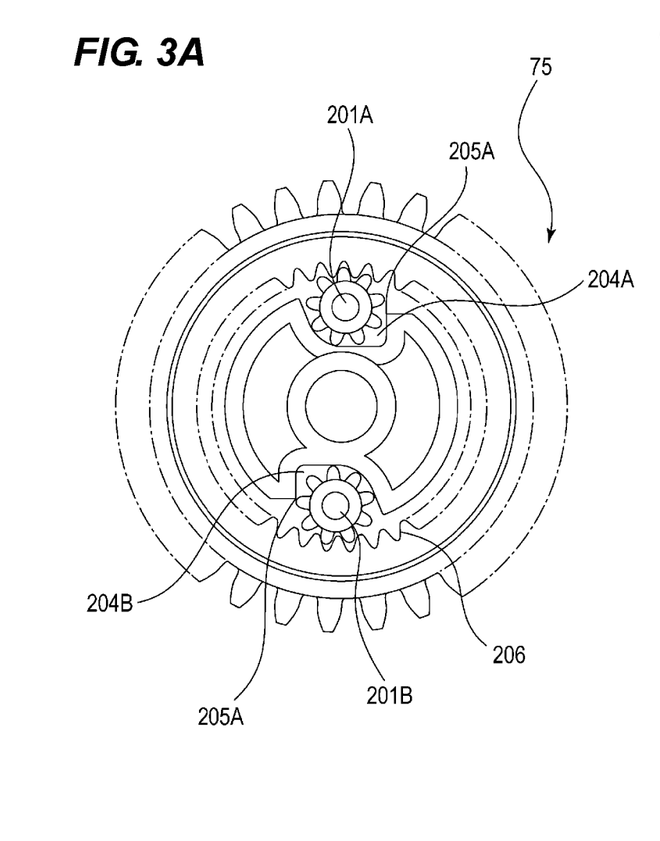
FIGS. 3A and 3B are a cross-sectional view and a side view of the one-way clutch according to the present example, respectively.
Figure 3B:
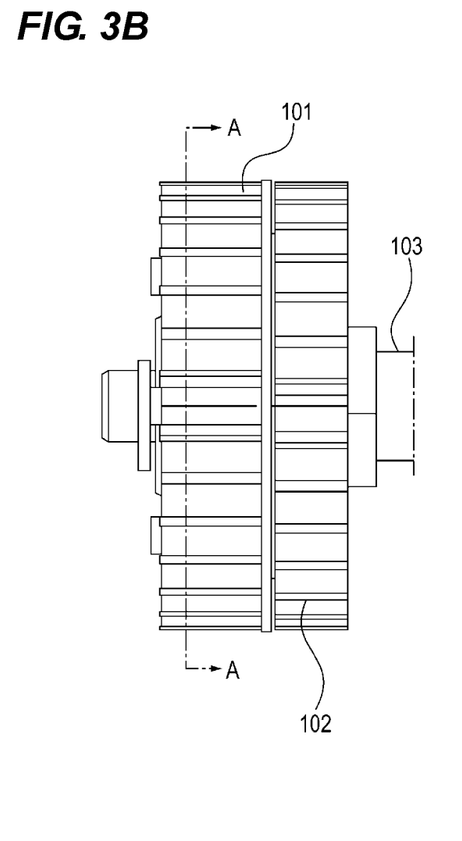
Figure 4A:
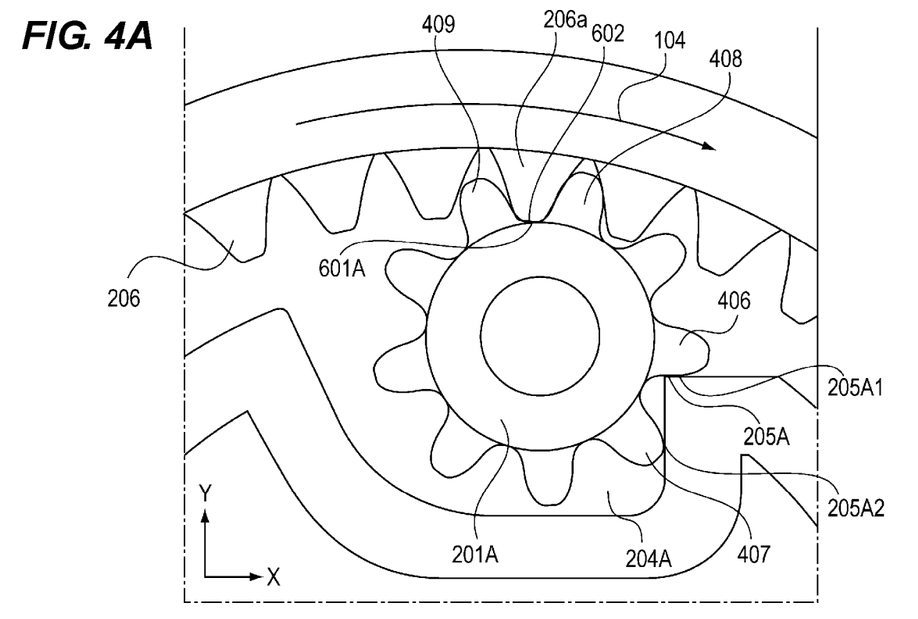
FIGS. 4A and 4B are partial enlarged views of the one-way clutch according to the present example.
Figure 4B:
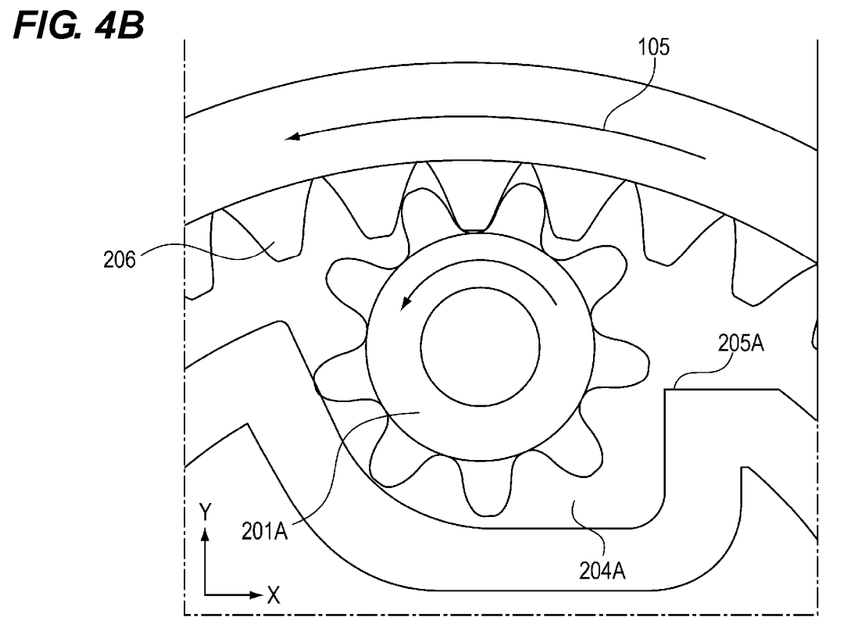

Next, the one-way clutch 75 according to an example of the present invention will be described with reference to FIGS. 1 to 4. FIG. 1 is an overall perspective view of the one-way clutch. FIGS. 2A and 2B are exploded perspective views of the one-way clutch. FIG. 3A is a cross-sectional view of the one-way clutch, and FIG. 3B is a side view of the one-way clutch. FIG. 3A is a cross-sectional view of the one-way clutch in FIG. 3B, viewed along arrows A-A in FIG. 3B. FIGS. 4A and 4B are partial enlarged views of the one-way clutch.

As illustrated in FIGS. 1, 3A, and 3B, the one-way clutch 75 includes a gear 102 as an inner member, a gear 101 as an outer member, and at least one planetary gear. Two planetary gears 201A, 201B are exemplified as the at least one planetary gear. The gear 101 as an outer member is driven by a power source not shown through a plurality of idler gears not shown, and allows the gear 102 as an inner member and a shaft 103 to synchronously rotate. An idler gear not shown is connected to the gear 102 to allow a shaft that is not shown and is disposed downstream from the gear 102 in a drivetrain to rotate synchronously with the shaft 103. When the gear 101 rotates in a rotational direction 104, that is, to one side relative to the gear 102, a one-way clutch portion that will be described below allows the gear 101 to engage with the gear 102 in torque transmission relationship (locked state). When the gear 101 rotates in a rotational direction 105, that is, to the other side relative to the gear 102, the one-way clutch portion disengages the torque transmission relationship (idle state). When the power source not shown rotates the gear 101 in the rotational direction 105, the one-way clutch portion transmits driving force to another rotating member not shown without allowing the gear 102 and the shaft 103 to rotate.

As illustrated in FIGS. 2A and 2B, the gear 101 is rotatably supported on a fitting portion 202 of the shaft 103 and is rotatable together with the shaft 103. The gear 102 fits onto and is supported by a D-shaped portion 203 of the shaft 103 to rotate synchronously with the shaft 103. Further, the gear 102 is an inner member that is cylindrical, and has an inner periphery including an internal gear 206. The gear 101 is an outer member that is rotatably disposed within the internal gear 206. The gear 101 includes two recesses 204A, 204B that include engagement edge portions 205A, 205B at outer peripheries of the two recesses 204A, 204B, respectively. The planetary gears 201A, 201B are rotatably accommodated in the two recesses 204A, 204B, respectively, and are disposed to mesh with the internal gear 206.

Next, the torque transmission relationship between the gear 101 as an outer member and the gear 102 as an inner member will be described with reference to FIGS. 4A and 4B. FIG. 4A is an enlarged view of the recess 204A in a locked state in the one-way clutch. FIG. 4B is an enlarged view of the recess 204A in an idle state in the one-way clutch.

Although relationship between the internal gear 206 and the planetary gear 201A accommodated in the recess 204A is illustrated in FIGS. 4A and 4B, relationship between the internal gear 206 and the planetary gear 201B accommodated in the recess 204B not shown has a similar relationship.

As illustrated in FIG. 4A, when the internal gear 206 of the gear 102 rotates in the rotational direction 104, that is, to one side relative to the recess 204A of the gear 101, the rotation allows the engagement edge portion 205A to engage with a portion between two teeth of the planetary gear 201A. As a result, the planetary gear 201A is prevented from rotating, and allows the gear 101 to engage with the gear 102 in the torque transmission relationship. The portion between two teeth of the planetary gear 201A that engages with the engagement edge portion 205A that is formed at an outer periphery of the recess 204A is a portion between two adjacent teeth 406, 407. The engagement edge portion 205A includes an abutting surface 205A1 that abuts on the tooth 406 of the two adjacent teeth 406, 407 that constitute the portion between two teeth of the planetary gear 201A, and an abutting surface 205A2 that abuts on the other tooth 407.

Further, as illustrated in FIG. 4A, when the gear 101 engages with the gear 102 in the torque transmission relationship, a top land 602 of the internal gear 206 abuts on a bottom land 601A of the planetary gear 201A that is opposite to the top land 602. More specifically, one tooth 206a of the internal gear 206 that is opposite to the bottom land 601A abuts on the bottom land 601A of the planetary gear 201A and tooth surfaces of two adjacent teeth 408, 409 between which the bottom land 601A exists.

On the other hand, as illustrated in FIG. 4B, when the internal gear 206 of the gear 102 rotates in the rotational direction 105, that is, to the other side relative to the recess 204A of the gear 101, the rotation disengages engagement between the portion between two teeth of the planetary gear 201A and the engagement edge portion 205A. As a result, the planetary gear 201A is allowed to rotate, allows relative rotation between the gear 101 and the gear 102, and disengages the torque transmission relationship between the gear 101 and the gear 102.

Loads that act on a planetary gear of the one-way clutch according to the present example in a locked state will be described with reference to FIG. 5 while compared with a one-way clutch according to a comparative example in FIG. 9.

Figure 5:
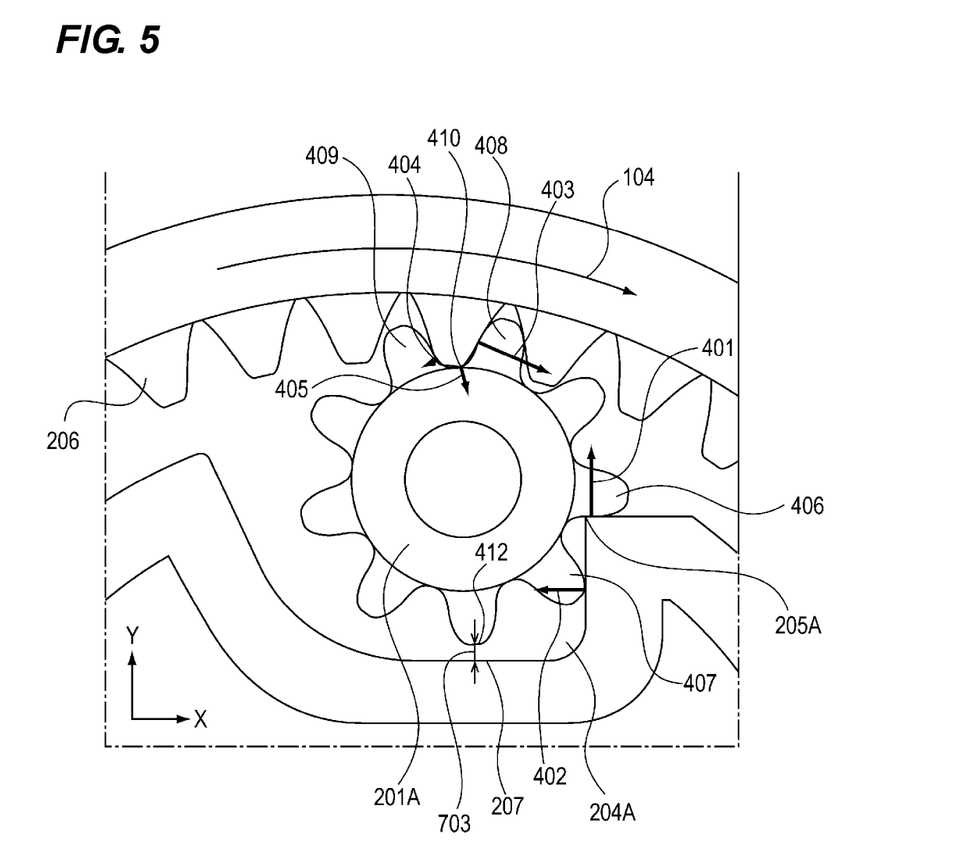
FIG. 5 illustrates relationship between loads of a planetary gear according to the present example in a locked state.

FIG. 5 schematically illustrates loads that act on the planetary gear 201A of the one-way clutch according to the present example in a locked state. As illustrated in FIG. 5, the engagement edge portion 205A engages with a portion between two teeth of the planetary gear 201A so that a reaction force 401 from the engagement edge portion 205A acts on a tooth 406 of the planetary gear 201A, and a reaction force 402 from the engagement edge portion 205A acts on a tooth 407 of the planetary gear 201A. Further, a reaction force 403 from a portion where the internal gear 206 meshes with the planetary gear 201A acts on a tooth 408 of the planetary gear, and a reaction force 404 from the portion where the internal gear 206 meshes with the planetary gear 201A acts on a tooth 409 of the planetary gear. Further, a reaction force 405 acts on the planetary gear 201A at a contact point 410 between a bottom land of the planetary gear 201A and a top land of the internal gear 206. The planetary gear 201A according to the present example is designed so that load values $F_{401}$, $F_{402}$, $F_{403}$, and $F_{404}$ that act on the teeth 406 to 409, respectively, have relationship $F_{401} \approx F_{403} > F_{402} > F_{404}$.

Figure 9:
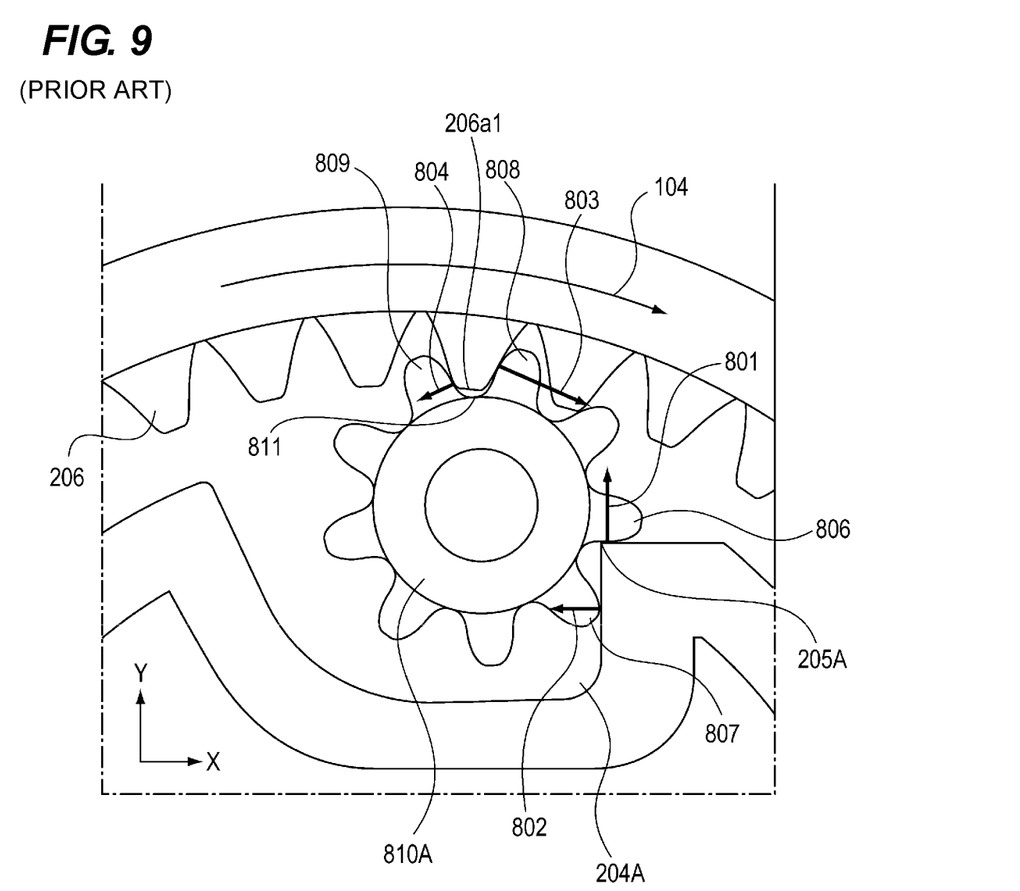
FIG. 9 illustrates relationship between loads of a planetary gear according to the comparative example in a locked state.

FIG. 9 schematically illustrates loads that act on a planetary gear of a one-way clutch according to a comparative example in a locked state. As illustrated in FIG. 9, since a planetary gear 810A according to the comparative example is configured so that a bottom land 811 of the planetary gear 810A does not touch a top land 206a1 of an internal gear 206, the reaction force 405 illustrated in FIG. 5 does not exist. Therefore, the planetary gear 810A according to the comparative example is configured so that loads 803, 804 that act on teeth 808, 809 that mesh with a tooth of the internal gear increase compared with the planetary gear 201A according to the present example. For the planetary gear 810A according to the comparative example, load values $F_{801}$, $F_{802}$, $F_{803}$, and $F_{804}$ that act on teeth 806 to 809, respectively, have relationship $F_{803} > F_{801} > F_{802} > F_{804}$. Therefore, reduction in a diameter of the planetary gear 810A according to the comparative example causes deformation or breakage of the tooth 808.

The planetary gear 201A according to the present example is designed to optimize the relationship between loads that act on teeth of the planetary gear compared with the planetary gear according to the comparative example. Therefore, since the tooth 408 of the planetary gear has a greater allowable load than the planetary gear 810A according to the comparative example to resist deformation or breakage, reduction in a dimeter of the planetary gear is easy.

Figure 6A:
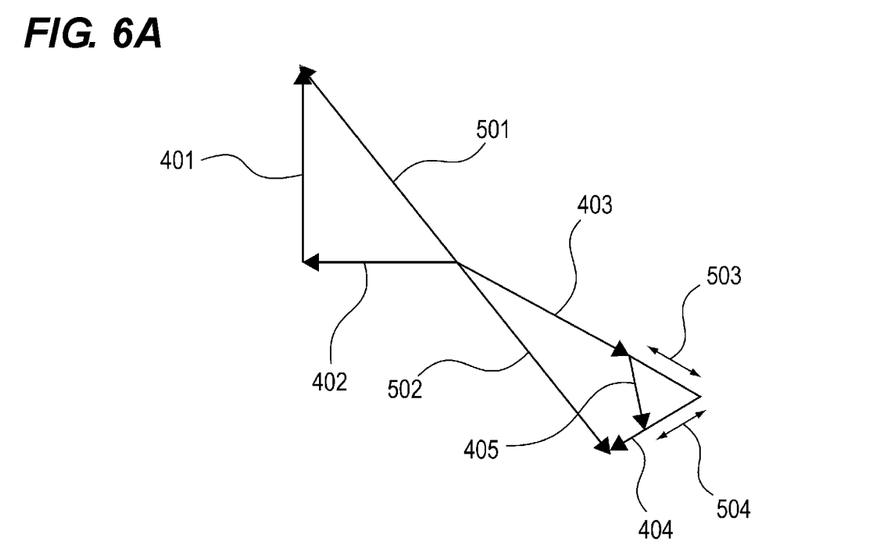
FIGS. 6A and 6B illustrate relationship of mechanical balance of loads of a planetary gear according to the present example and a planetary gear according to a comparative example, respectively.
Figure 6B:
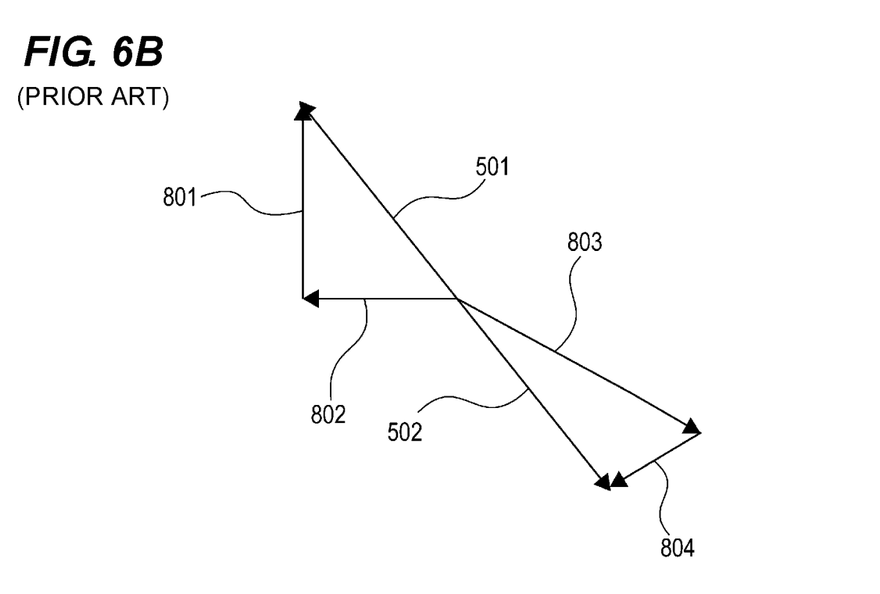

FIG. 6A illustrates relationship of mechanical balance between loads that act on the planetary gear 201A according to the present example in a locked state, and FIG. 6B illustrates relationship of mechanical balance between loads that act on the planetary gear 810A according to the comparative example in a locked state. A load 501 is a resultant force of a load 401 and a load 402, and another load 501 is a resultant force of a load 801 and a load 802. A load 502 is a resultant force of a load 403, a load 404, and a load 405, and another load 502 is a resultant force of a load 803 and a load 804. Balance between the load 501 and the load 502 limits movement of the planetary gear 201A according to the present example in a locked state and movement of the planetary gear 810A according to the comparative example in a locked state. Such a drawing of relationship of mechanical balance shows that since the load 405 exists in the planetary gear 201A according to the present example, the load 403 decreases by an amount of reduction 503, and the load 404 decreases by an amount of reduction 504 compared with the planetary gear 810A according to the comparative example.

Figure 7:
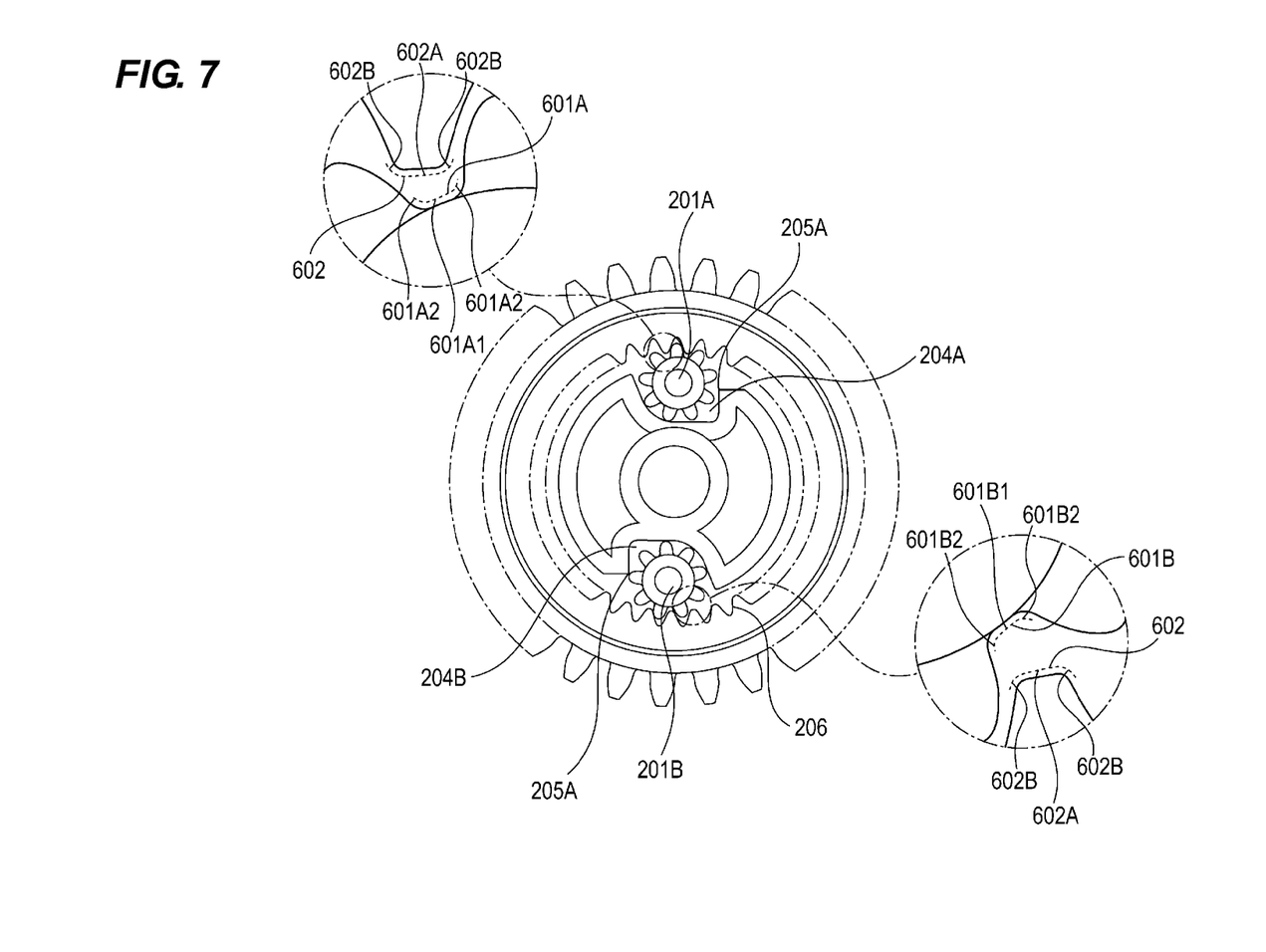
FIG. 7 illustrates bottom lands of planetary gears and top lands of an internal gear according to the present example.

FIG. 7 illustrates a region around bottom lands 601A, 601B of the planetary gears 201A, 201B and top lands 602 of the internal gear 206 according to the present example.

The above effect of the present example that is obtained by abutment between bottom-land circular-arc-shaped portions 601A1, 601B1 of the planetary gears 201A, 201B and a top-land circular-arc-shaped portion 602A of the internal gear 206 is similarly obtained by abutment between bottom-land arc-shaped portions 601A2, 601B2 that exist on both sides of the bottom-land circular-arc-shaped portions of the planetary gears 201A, 201B and top-land arc-shaped portions 602B that exist on both sides of the top-land circular-arc-shaped portion of the internal gear 206. Therefore, each of the bottom lands 601A, 601B of the planetary gears 201A, 201B according to the present example is defined as a region that includes the bottom-land circular-arc-shaped portion and the bottom-land arc-shaped portions that exist on both sides of the bottom-land circular-arc-shaped portion. The top land 602 of the internal gear 206 is defined as a region that includes the top-land circular-arc-shaped portion and the top-land arc-shaped portions that exist on both sides of the top-land circular-arc-shaped portion. The bottom-land circular-arc-shaped portions 601A1, 601B1 of the planetary gears 201A, 201B are circular arcs whose centers are at rotational centers of the planetary gears, respectively. Similarly, the top-land circular-arc-shaped portion 602A of the internal gear 206 is a circular arc whose center is at a rotational center of the gear 102.

Figure 8:
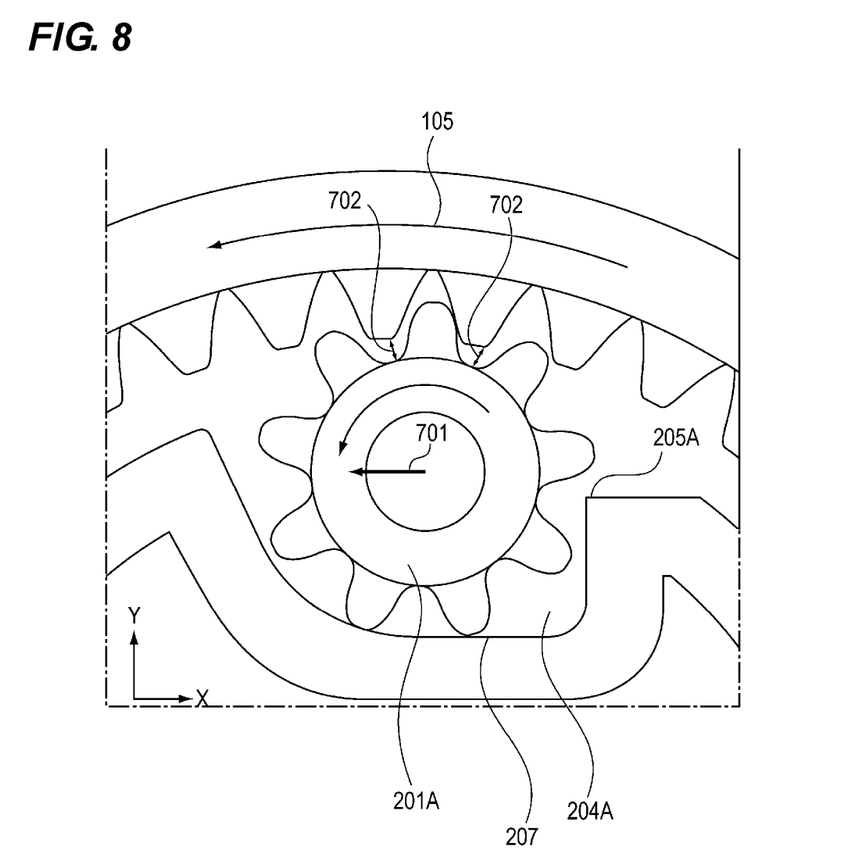
FIG. 8 is a partial enlarged view of the one-way clutch according to the present example.

Further, when the planetary gears 201A, 201B according to the present example shift from a locked state illustrated in FIG. 4A to an idle state illustrated in FIG. 4B, abutment (touching state) between bottom lands 601A, 601B of the planetary gears 201A, 201B and a top land 602 of the internal gear 206 is temporarily disengaged. FIG. 8 is an enlarged view of the recess 204A during shift from a locked state to an idle state. When the internal gear 206 rotates in the rotational direction 105, that is, to the other side relative to the recess 204A, from a locked state illustrated in FIG. 4A, the planetary gear 201A moves in a direction 701. During that time, the bottom land 601A of the planetary gear 201A separates from the top land 602 of the internal gear 206, and a gap 702 is formed between the bottom land 601A of the planetary gear 201A and the top land 602 of the internal gear 206. The gap 702 allows smooth shift from a locked state to an idle state, even if the gear 101 does not align with the gear 102 in a radial direction, for example.

If a bottom portion 207 of the recess 204A is at least planar relative to a circular arc formed by a plurality of top lands of the internal gear 206 that are opposite to the bottom portion 207, the gap 702 is formed between the bottom land 601A of the planetary gear 201A and the top land 602 of the internal gear 206 during shift from a locked state to an idle state. However, the following configuration may also be possible. As illustrated in FIG. 5, when the gear 101 engages with the gear 102 in the torque transmission relationship, engagement between the engagement edge portion 205A and a portion between two teeth of the planetary gear 201A separates the planetary gear 201A from the bottom portion 207 of the recess 204A, and a gap 703 is formed between the bottom portion 207 of the recess 204A and a top land 412 of the planetary gear 201A that is opposite to the bottom portion 207. Such a configuration provides smoother shift from a locked state to an idle state.

As described above, the present example allows a top land 602 of the internal gear 206 to abut on a bottom land 601A of the planetary gear 201A that is opposite to the top land 602 of the internal gear 206 when the gear 101 engages with the gear 102 in the torque transmission relationship. As a result, reduction in a diameter of the one-way clutch is facilitated without causing decrease in allowable transmission torque and increase in axial size.

Other Examples

Although the above example exemplifies a gear that includes teeth (gear portion) on an outer periphery of the gear as the outer member or the inner member, the present invention is not limited to the configuration. For example, a pulley that includes a holding portion, such as a groove, that holds a belt on an outer periphery of the pulley, or a roller that includes a member, such as rubber, on an outer periphery of the roller may be used as the outer member or the inner member.

Although the above example exemplifies two planetary gears as the at least one planetary gear of the one-way clutch, the present invention is not limited to the configuration. One or three or more planetary gear(s) may be appropriately disposed as necessary.

Although the above example exemplifies a configuration in which the one-way clutch is used as a driving-force transmitting member that transmits driving force to a conveying member for return conveyance in the sheet conveying system as the sheet conveying apparatus, the present invention is not limited to the configuration. The one-way clutch may be appropriately used in other conveying members in the sheet conveying system.

Although the above example exemplifies a configuration in which the present invention is applied to the one-way clutch that transmits driving force to a conveying member that conveys a sheet in the image forming apparatus that includes the image forming portions that form an image on a sheet, the present invention is not limited to the configuration. A similar effect is obtained even if the present invention is applied to a one-way clutch that transmits driving force to a conveying member that conveys a sheet in a sheet conveying apparatus, such as a feed deck that is optionally attached to an image forming apparatus.

Although the above example includes the four image forming portions that constitute the image forming engine, the number of image forming portions is not limited to four and may be appropriately determined as necessary.

Although the above example includes a laser scanner portion as the exposure portion, the present invention is not limited to the configuration, and an LED array may be included, for example.

Further, in the above example, a process cartridge that includes the photosensitive drum, the charge portion as a process portion that acts on the photosensitive drum, the developer portion, and a cleaning portion is exemplified as a process cartridge that is removable relative to the image forming apparatus. The present invention is not limited to the configuration. The process cartridge may include one of the charge portion, the developer portion, and the cleaning portion, in addition to the photosensitive drum.

Further, although the above example exemplifies a printer as an image forming apparatus, the present invention is not limited to the configuration. The image forming apparatus may be a copying machine, a fax, or a multifunction printer that has functions of the copying machine and the fax. Further, although an image forming apparatus that includes an intermediate transfer member, transfers different colored toner images on the intermediate transfer member in a sequentially superimposed manner, and transfers the superimposed toner image borne by the intermediate transfer member to a recording medium is exemplified, the present invention is not limited to the configuration. The image forming apparatus may include a recording-medium bearing member, and may transfer different colored toner images to a recording medium borne by the recording-medium bearing member in a sequentially superimposed manner. A similar effect is obtained by applying the present invention to a one-way clutch used in a conveying member in these image forming apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-064294, filed Mar. 29, 2018, which is hereby incorporated by reference herein in its entirety.

What is claimed is:

1. A one-way clutch comprising:
a first member that has an inner periphery including an internal gear;
a second member that is rotatably disposed and includes an engagement portion; and
a planetary gear that is rotatable relative to the second member, meshes with the internal gear, and is prevented from rotating by engaging with the engagement portion, wherein
in a state in which the first member and the second member rotate together, the planetary gear engages with the engagement portion;
in a state in which relative rotation between the first member and the second member is performed, the planetary gear disengages from the engagement portion; and
in a state in which the planetary gear engages with the engagement portion, a top land of the internal gear abuts on a bottom land of the planetary gear.

2. The one-way clutch according to claim 1, wherein when the state in which the planetary gear engages with the engagement portion shifts to a state in which the planetary gear disengages from the engagement portion, the abutment between the top land of the internal gear and the bottom land of the planetary gear is temporarily disengaged.

3. The one-way clutch according to claim 1, wherein when the state in which the planetary gear engages with the engagement portion shifts to a state in which the planetary gear disengages from the engagement portion, the bottom land of the planetary gear separates from the top land of the internal gear, and a gap is formed between the bottom land of the planetary gear and the top land of the internal gear.

4. The one-way clutch according to claim 1, wherein the second member includes a recess that accommodates the planetary gear, and
in the state in which the planetary gear engages with the engagement portion, engagement between a portion between two teeth of the planetary gear and the engagement portion separates the planetary gear from a bottom portion of the recess, and a gap is formed between the bottom portion of the recess and a top land of the planetary gear that is opposite to the bottom portion.

5. The one-way clutch according to claim 1, wherein in the state in which the planetary gear engages with the engagement portion, one tooth of the internal gear that is opposite to the bottom land of the planetary gear abuts on the bottom land of the planetary gear and tooth surfaces of two adjacent teeth of the planetary gear between which the bottom land exists.

6. The one-way clutch according to claim 1, wherein in the state in which the planetary gear engages with the engagement portion, the engagement portion engages with two adjacent teeth of the planetary gear that constitute a depression portion.

7. A sheet conveying apparatus comprising:
a one-way clutch; and
a conveying member to which driving force is transmitted through the one-way clutch and which conveys a sheet, wherein
the one-way clutch includes:
a first member that has an inner periphery including an internal gear;
a second member that is rotatably disposed and includes an engagement portion; and
a planetary gear that is rotatable relative to the second member, meshes with the internal gear, and is prevented from rotating by engaging with the engagement portion, wherein
in a state in which the first member and the second member rotate together, the planetary gear engages with the engagement portion;
in a state in which relative rotation between the first member and the second member is performed, the planetary gear disengages from the engagement portion; and
in a state in which the planetary gear engages with the engagement portion, a top land of the internal gear abuts on a bottom land of the planetary gear.

8. The sheet conveying apparatus according to claim 7, wherein
when the state in which the planetary gear engages with the engagement portion shifts to a state in which the planetary gear disengages from the engagement portion, the abutment between the top land of the internal gear and the bottom land of the planetary gear is temporarily disengaged.

9. The sheet conveying apparatus according to claim 7, wherein
when the state in which the planetary gear engages with the engagement portion shifts to a state in which the planetary gear disengages from the engagement portion, the bottom land of the planetary gear separates from the top land of the internal gear, and a gap is formed between the bottom land of the planetary gear and the top land of the internal gear.

10. The sheet conveying apparatus according to claim 7, wherein
the second member includes a recess that accommodates the planetary gear, and
in the state in which the planetary gear engages with the engagement portion, engagement between a portion between two teeth of the planetary gear and the engagement portion separates the planetary gear from a bottom portion of the recess, and a gap is formed between the bottom portion of the recess and a top land of the planetary gear that is opposite to the bottom portion.

11. The sheet conveying apparatus according to claim 7, wherein
in the state in which the planetary gear engages with the engagement portion, one tooth of the internal gear that is opposite to the bottom land of the planetary gear abuts on the bottom land of the planetary gear and tooth surfaces of two adjacent teeth of the planetary gear between which the bottom land exists.

12. The sheet conveying apparatus according to claim 7, wherein
in the state in which the planetary gear engages with the engagement portion, the engagement portion engages with two adjacent teeth of the planetary gear that constitute a depression portion.

13. An image forming apparatus comprising:
an image forming portion that forms an image on a sheet;
a one-way clutch; and
a conveying member to which driving force is transmitted through the one-way clutch and which conveys the sheet, wherein
the one-way clutch includes:
a first member that has an inner periphery including an internal gear;
a second member that is rotatably disposed and includes an engagement portion; and
a planetary gear that is rotatable relative to the second member, meshes with the internal gear, and is prevented from rotating by engaging with the engagement portion, wherein
in a state in which the first member and the second member rotate together, the planetary gear engages with the engagement portion;
in a state in which relative rotation between the first member and the second member is performed, the planetary gear disengages from the engagement portion; and
in a state in which the planetary gear engages with the engagement portion, a top land of the internal gear abuts on a bottom land of the planetary gear.

14. The image forming apparatus according to claim 13, wherein
when the state in which the planetary gear engages with the engagement portion shifts to a state in which the planetary gear disengages from the engagement portion, the abutment between the top land of the internal gear and the bottom land of the planetary gear is temporarily disengaged.

15. The image forming apparatus according to claim 13, wherein
when the state in which the planetary gear engages with the engagement portion shifts to a state in which the planetary gear disengages from the engagement portion, the bottom land of the planetary gear separates from the top land of the internal gear, and a gap is formed between the bottom land of the planetary gear and the top land of the internal gear.

16. The image forming apparatus according to claim 13, wherein
the second member includes a recess that accommodates the planetary gear, and
in the state in which the planetary gear engages with the engagement portion, engagement between a portion between two teeth of the planetary gear and the engagement portion separates the planetary gear from a bottom portion of the recess, and a gap is formed between the bottom portion of the recess and a top land of the planetary gear that is opposite to the bottom portion.

17. The image forming apparatus according to claim 13, wherein
in the state in which the planetary gear engages with the engagement portion, one tooth of the internal gear that is opposite to the bottom land of the planetary gear abuts on the bottom land of the planetary gear and tooth surfaces of two adjacent teeth of the planetary gear between which the bottom land exists.

18. The image forming apparatus according to claim 13, wherein
when the planetary gear engages with the engagement portion, the engagement portion engages with two adjacent teeth of the planetary gear that constitute a depression portion.

* * * * *